Feb. 6, 1968  F. L. HOFF  3,367,642
AIR HEATING APPARATUS
Filed Sept. 29, 1965  6 Sheets-Sheet 1

INVENTOR
FRANCIS L. HOFF
BY Hans G. Hoffmeister
ATTORNEY

United States Patent Office 3,367,642
Patented Feb. 6, 1968

3,367,642
AIR HEATING APPARATUS
Francis L. Hoff, Santa Clara, Calif., assignor to FMC Corporation, San Jose, Calif., a corporation of Delaware
Filed Sept. 29, 1965, Ser. No. 491,275
14 Claims. (Cl. 263—19)

ABSTRACT OF THE DISCLOSURE

A heating apparatus having a housing with an inlet opening for receiving a flow of air and a discharge opening for expelling the air therefrom. A series of walls in the housing defining a sinuous passage from the inlet opening to the discharge opening through which the air travels. A heater disposed within the innermost wall whereby heat loss to the outer atmosphere is reduced to a minimum.

---

The present invention pertains to a heating apparatus and more particularly to an apparatus for directing hot air onto an article.

The present invention constitutes a further development in the apparatus disclosed in the copending application of Leslie Vadas et al., Ser. No. 461,738, filed June 7, 1965 for Method and Machine for Forming and Filling Cartons, assigned to the assignee of the present application.

By way of background for the present invention, the apparatus in said copending application places empty cartons with open tops and bottoms on mandrels of a turret which indexes the mandrels and cartons into successive preliminary and final bottom heating stations. Heating apparatus is provided adjacent to these heating stations for directing hot air at predetermined portions of the bottom flaps of the cartons in order to heat and render tacky the polyethylene coatings on these flaps preparatory to sealing of the flaps at a subsequent station.

The heating apparatus used in the apparatus of this prior copending application has performed its intended functions but, nevertheless, is subject to certain problems which the present invention overcomes. In the prior apparatus, air is blown downwardly past nine heating elements located in a circular array above the carton carrying turret. The heated air is then channeled through appropriate ducts to tubes which are connected to discharge nozzles that confront the mandrels on the turret when the mandrels are located in the heating stations. These tubes and nozzles are reciprocated forwardly, to place the nozzles in close proximity to the bottom flaps, and rearwardly to permit movement of the cartons into and out of the heating stations.

A problem with this prior apparatus is that considerable heat is lost between the heating elements and the discharge nozzle, this heat being radiated to the atmosphere around the heating apparatus, thereby causing discomfort to personnel attending the machine. Of course, the machine surfaces of the heating apparatus were too hot to be touched with the human hand.

Furthermore, because of the heat loss described in the preceding paragraph, it was necessary to operate the heating elements at a temperature sufficiently high that, notwithstanding the loss, the temperature of the air discharged from the nozzles was high enough, namely 600° F., properly to heat the coating material on the cartons. In practice, it was found necessary to operate the heating elements at about 1800° F. At this elevated temperature, it was sometimes found that the metal of the heating elements oxidized causing small particles of the metal to become entrained in the air stream whereupon these particles would be blown from the discharge nozzles into the open cartons on the mandrels, thereby resulting in contamination of the contents placed in the cartons.

Moreover, the extremely high temperature of the elements in this prior apparatus and the resulting high temperatures through the ducts leading from the elements to the tubes, which were connected to the discharge nozzle, necessitated the use of very expensive bearings which could withstand these temperatures.

Accordingly, it is an object of the present invention to provide an improved heating apparatus and one which is particularly suited for use in directing hot air at an article.

Another object is to provide a heating apparatus which minimizes loss of heat and economizes on the amount of power required to operate the apparatus.

Another object is to provide a heating apparatus for directing air on an article which retains the heat internally of the apparatus so that external surfaces of the apparatus are cool enough to touch with the human hand and the ambient temperature around the apparatus is not raised appreciably above normal room temperature.

Another object is to provide a heating apparatus in which heating elements can be operated at temperatures low enough to avoid oxidation and resultant flaking of the material of the elements, such temperatures also being below the stress limits of the elements.

Another object is to provide a heating apparatus in which the bearings for moving parts need not accommodate extremely high temperatures and thus can be of relatively inexpensive materials whereby squealing noises and rapid wearing are avoided.

Another object is to provide a heating apparatus which minimizes the number of parts required to constitute the apparatus whereby the weight of the apparatus is reduced and fabrication and repair are simplified.

These, together with other objects, will become apparent upon reference to the following description and accompanying drawings in which.

Referring more particularly to the drawings, a frame is generally identified by the numeral 15 and includes a horizontal upper surface 16. Mandrels 18 (FIG. 1) of a turret, which is otherwise not illustrated, are mounted for movement in a horizontal plane above the upper surface 16 and are successively indexed into and out of a preliminary heating station 20 and a final heating station 22. This turret may be of the construction shown and described adjacent to the bottom heating stations in the above-cited copending application, Ser. No. 461,738.

These mandrels are provided for receiving cartons, not shown, and for carrying these cartons, with their bottom flaps located outwardly of the mandrels, into and outward of the heating stations. Although not shown in FIG. 1 or the other figures, there are preferably upper and lower circular rows of mandrels in the turret, as in said prior co-pending application.

Figure 1:
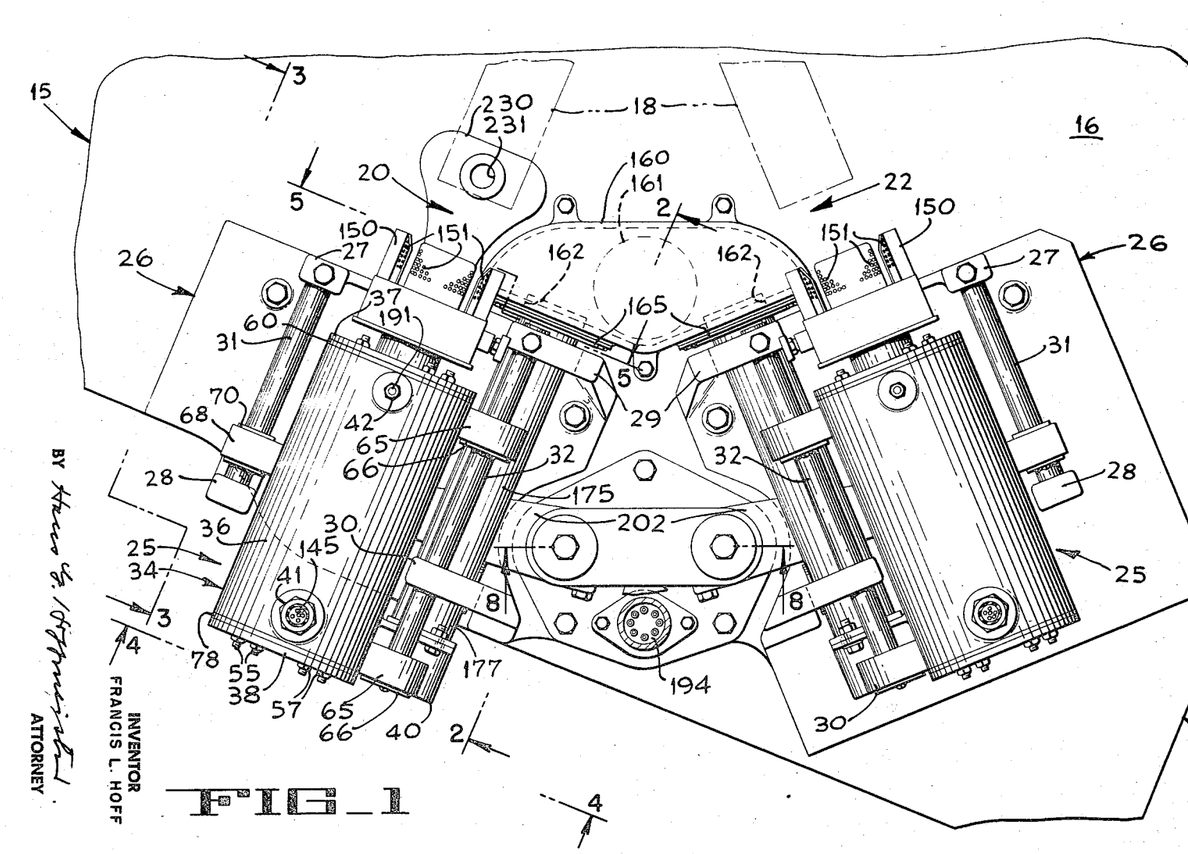
FIGURE 1 is a top plan of a heating apparatus embodying the principles of the present invention and being shown in association with a portion, indicated by phantom lines, of a carton forming and filling machine.

A pair of heaters 25 are mounted on the support frame 15 respectively adjacent to said preliminary and final heating stations 20 and 22. Since both heaters are of essentially the same construction, except for the reversal of certain parts, only the left heater, as viewed in FIG. 1, is described in detail. Accordingly, this left heater includes a sub-frame 26 bolted to the upper surface 16 of the support frame 15 and including left front and rear posts 27 and 28 and right front and rear posts 29 and 30. Substantially horizontal left and right slide rods 30 and 31 and 32 are respectively mounted in the left and right posts for supporting a heater housing 34 for reciprocating movement toward and away from the heating station 20.

Figure 3:
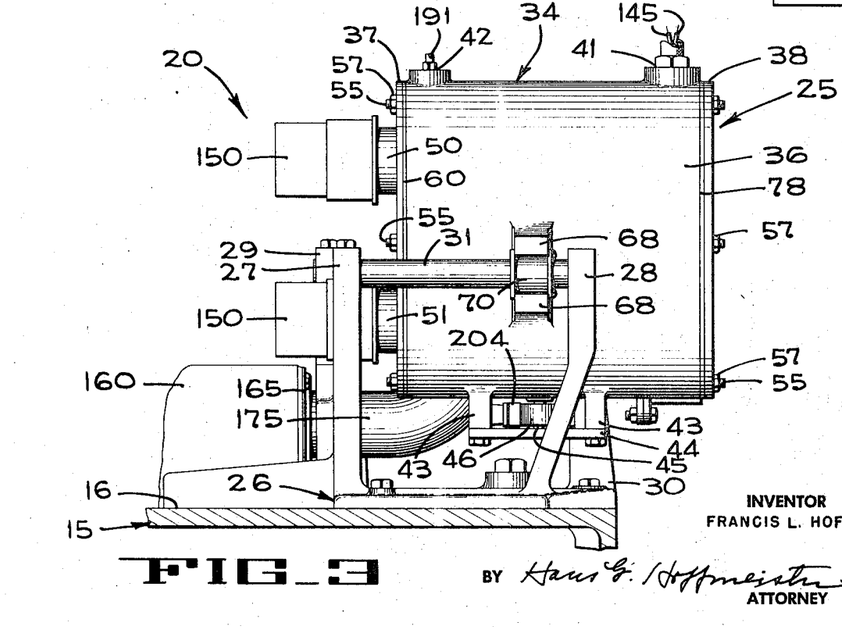
FIGURE 3 is a fragmentary vertical section taken on line 3—3 in FIGURE 1.

This heater housing 34 is of an elongated, mailbox-like shape and is made of metal. The housing has a generally elliptical wall 36 (FIG. 7) and front and back end walls 37 and 38, each having a generally elliptical edge, secured at opposite ends of the peripheral wall. The peripheral wall includes a lower side inlet 40, a top rear opening 41 and a top front hole 42, all for a purpose to be described. Spaced bosses 43 project downward (FIG. 3) from the peripheral wall, and a strap 44 is secured to these bosses. A driven pin 45 also projects down from the peripheral wall between the bosses, and a bearing 46 is mounted on this pin above the strap.

The front end wall 37 includes upper and lower outlets 50 and 51 directed toward the upper and lower heating stations 20 for alignment with the mandrel 18 when they are in such heating stations.

The walls 36, 37 and 38 are held together by upper, lower and lateral threaded rods 55 which extend through the front and back end walls and inwardly projecting bosses 56 of the peripheral wall 36 and by nuts 57 threaded on the opposite ends of the rods and tightened against the end walls. An outside front gasket 60 is positioned between the front end wall and the peripheral wall thereby insulating the front end wall from the peripheral wall.

In order to mount the left housing 34 on its corresponding slide rods 31 and 32, bosses 65 project outward from the right side of the peripheral wall 36 and carry bearings 66 slidably receiving the right slide rod 32. Spaced upper and lower lugs 68 project outward from the left side of the peripheral wall 36 and mount a bearing 70 which slidably receives the left slide rod 31. It will be understood, therefore, that the housing 34 is mounted on the slide rods for fore and aft reciprocating movement.

Figure 6:
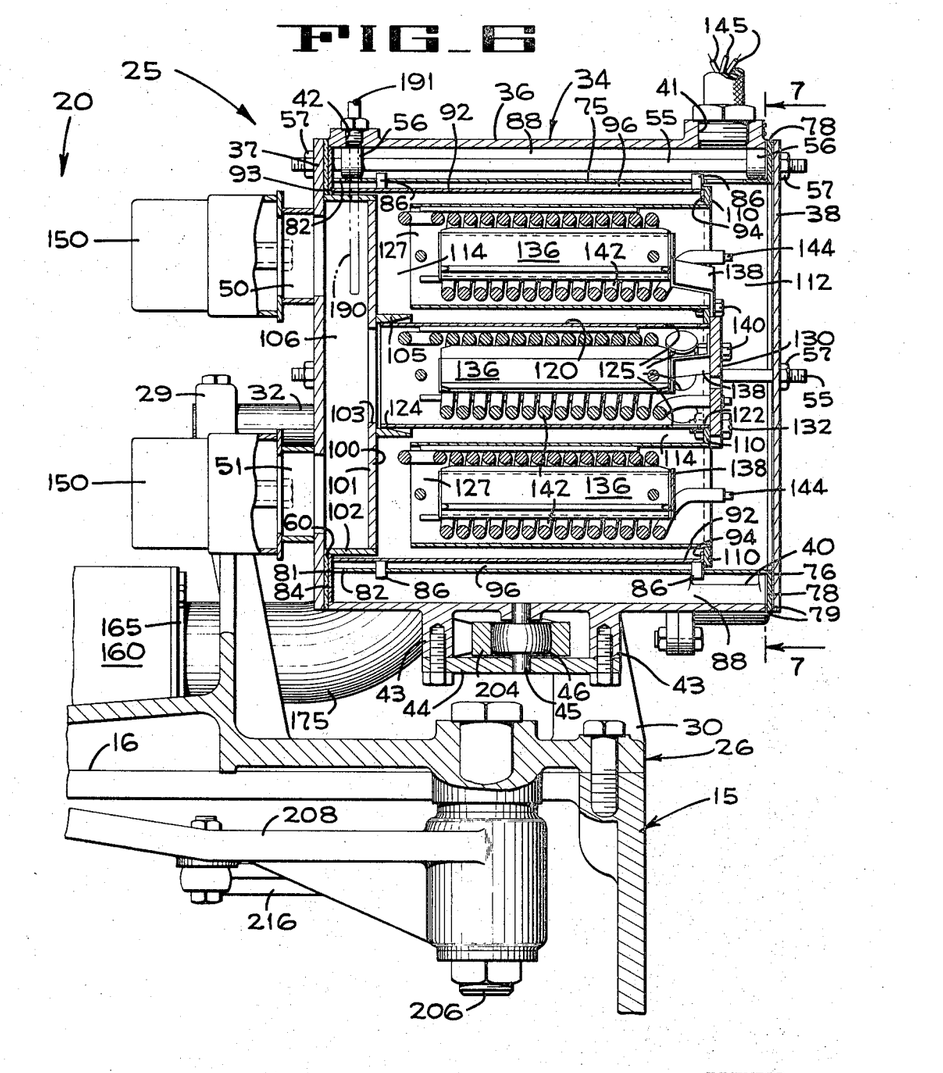
FIGURE 6 is an enlarged vertical section taken on line 6—6 in FIGURE 4, but with some parts being shown in side elevation and other portions being broken away.
Figure 7:
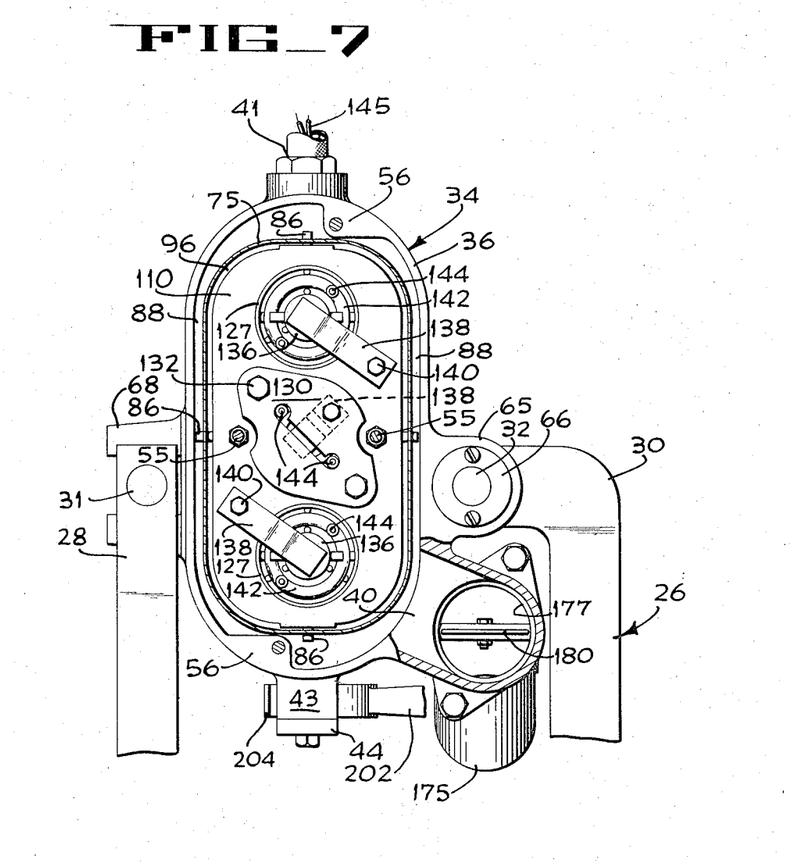
FIGURE 7 is a transverse vertical section taken on a plane at a position indicated by line 7—7 in FIGURE 6.

With particular reference to FIGS. 6 and 7, significant features of internal construction in the housing 34 are to be noted. The heater 25 thus includes a generally elliptical intermediate wall 75 positioned within the housing 34 in circumferentially spaced relation to the peripheral wall 36 and having a rear edge 76 secured to a rear rim 78 which is sandwiched between the back end wall 38 and the peripheral wall, with rear gaskets 79 interposed the rim and the back end wall and the rim and the peripheral wall. The intermediate wall also includes a front edge 81 having a plurality of notches 82 therein and abutting an inside front gasket 84 whereby the intermediate wall is also insulated from the front end wall 37. The intermediate wall has a plurality of spacers 86 projecting radially inward therefrom. The peripheral wall, the intermediate wall and portions of the front and back end walls define an annular outer or inlet chamber 88 which communicates with the side inlet 40 to the housing, it being noted that this side inlet opens into the outer chamber adjacent to the back end wall. Also, this outer chamber communicates with the notches 82 in the front edge 81 of the intermediate wall.

Continuing with the description of the left heater 25 and with continued reference to FIGS. 6 and 7, an elliptical inner wall 92 is positioned within the housing 34 in circumferentially inwardly spaced relation to the intermediate wall 75. The inner wall has a front edge 93 in fluid-tight circumferential engagement with the inside gasket 84 and a rear, in-turned lip 94 adjacent to the rear spacers 86 on the intermediate wall 75. These spacers engage the inner wall and maintain it in spaced relation to the intermediate wall thereby to define with the intermediate wall and the inside gasket, an annular intermediate chamber 96 which communicates with the notches 82 in the front edge 81 of the intermediate wall.

An outlet wall 100 (FIG. 6) is located within the housing 34 and includes a transverse portion 101 mounted on the lateral rods 55 in spaced parallel relation to the front end wall 37 and an elliptical skirt 102 projecting from the transverse portion toward and into engagement with the front end wall radially outward of the outlets 50 and 51. The transverse portion has a central port 103, and a socket 105 projects rearward from the transverse portion around the port. The outlet wall and a portion of the front end wall define an elliptical front plenum chamber 106 which communicates with the upper and lower outlets 50 and 51 and with the central port 103.

Still further, the heater 25 includes a chamber wall 110 (FIGS. 6 and 7) mounted on the lateral rods 55 in spaced parallel relation to the back wall 38. This chamber wall, the back end wall and the intermediate wall 75 define a rear plenum chamber 112 which communicates with the intermediate chamber 96; and the chamber wall, the inner wall 92 and the outlet wall 100 define an inner chamber 14.

With continued reference to said significant features of internal construction, an open-ended central tube 120 has a rear end 122 secured in the chamber wall 110 and a front end 124 fitted in fluid-tight relation in the socket 105. This central tube has a plurality of spaced ports 125 located in a row adjacent to the rear end of the tube, these ports communicating both with the interior of the central tube and with the inner chamber 114. Furthermore, a pair of outer tubes 127 have their rear ends secured in the chamber wall and their front ends in adjacent spaced relation to the transverse portion 101 of the outlet wall 100. Furthermore, the outer tubes are on opposite sides of, peripherally spaced from, and in axially parallel relation to the central tube. The rear ends of the outer tubes open into the rear plenum chamber 112, but the rear end of the central tube is covered by an insulated cap 130 which is secured to the chamber wall by cap screws 132 so that there is no fluid communication between the rear plenum chamber and the inside of the central tube.

From the foregoing description, it will be understood that the notches 82, the intermediate chamber 96, the rear plenum chamber 112, the interiors of the outer tubes 127, the inner chamber 114, the ports 125, the interior of the central tube 120, the port 103, and the front plenum chamber 106 constitute a sinuous passage extending or winding its way forwardly and rearwardly in the housing 34 from the outer chamber 88 to the outlets 50 and 51.

Tubular plugs 136 are individually mounted within the tubes 120 and 127 by brackets 138 which are fastened to the chamber wall 110 by capscrews 140. Heater elements 142 are positioned within the tubes around their respective plugs and have terminals 144 projecting from the rear ends of the tubes, it being noted that the terminals of the heater element in the central tube project through the insulated cap 130. Wires 145 extend through the top rear opening 41 of the housing 34 and individually connect (but not shown for drafting clarity) to the terminals of the heater elements for supplying electrical energy thereto.

Upper and lower discharge nozzles 150 are secured to the upper and lower outlets 50 and 51 and have a plurality of apertures 150 and 151 located in such a manner as to direct air only at predetermined surfaces of the bottom flaps of the cartons, not shown, on the mandrels 18. For a more complete description of these nozzles, reference is made to the copending application Ser. No. 461,738 cited above.

Figure 2:
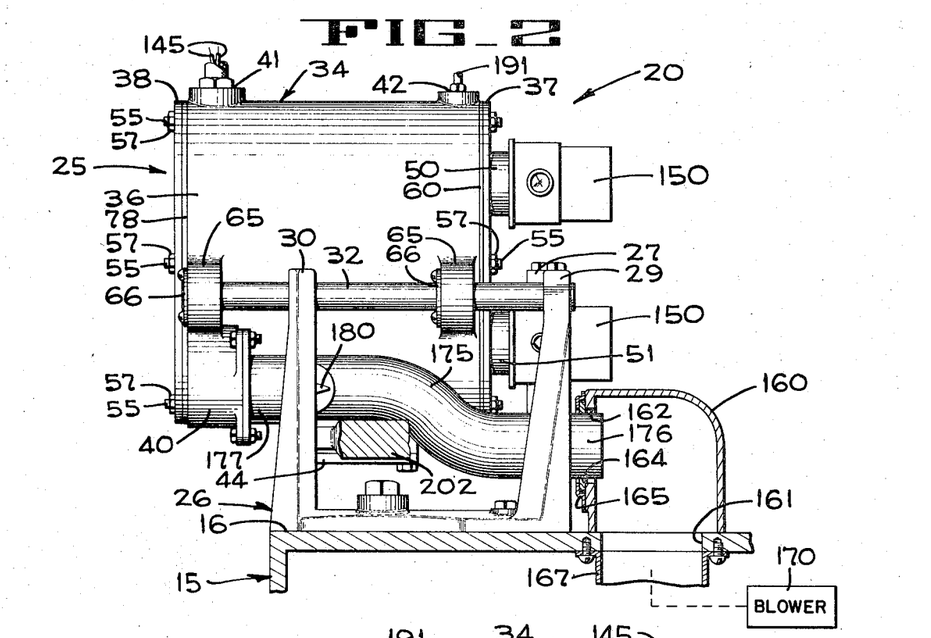
FIGURE 2 is a fragmentary vertical section taken on line 2—2 of FIGURE 1.

In order to supply the heaters 25 with moving air, a manifold 160 (FIGS. 1 and 2) is secured to the upper surface 16 of the support frame 15. The manifold has a downwardly directed inlet port 161 and a pair of rearwardly directed outlet ports 162. Annular seals 164 are mounted on the manifold in circumscribing relation to the outlet ports by mounting plates 165. An air supply duct 167 is secured to the support frame in surrounding relation to the inlet port 161 and has an opposite end, not shown, connected to an air blower 170.

Still considering only the left heater 25, an air pipe 175 extends along the right side of the housing 34 and has a front inlet end 176 fitted in the left inlet port 161 of the manifold 160 in slidable fluid-tight engagement with the corresponding seal 164. The air pipe also has a rear discharge end 177 secured to the inlet 40 of the housing. It is to be noted that the inlet end of the air pipe remains in fluid-tight coupled relation with the manifold even in the rearwardmost position of the housing during its reciprocation on the slide rods 31 and 32. A butterfly valve 180 is positioned within the discharge end 177 of the air pipe for adjusting the flow rate through the air pipe and thus into the housing.

For sensing the temperature inside the housing 34, a thermocouple generally identified by the numeral 190 is mounted within the housing through the top front hole 42, and electrical leads 191 extend from the housing. The leads 191 and the wires 145 extend from each housing 34 to a junction box, not shown, which is supported on mounting piece 194 on the upper surface 16 of the support frame 15.

Figure 4:
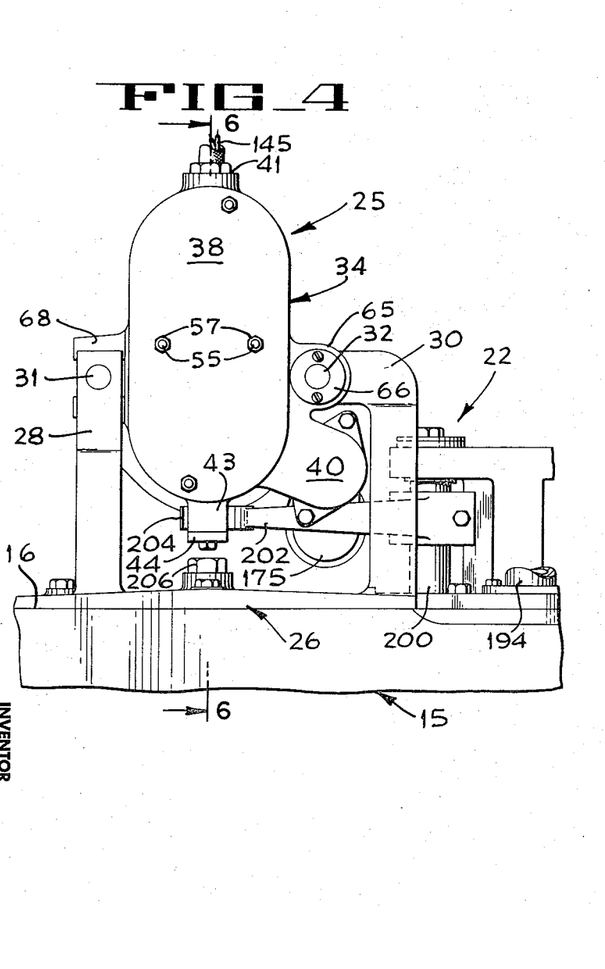
FIGURE 4 is a fragmentary rear elevation taken from a position indicated by line 4—4 in FIGURE 1.
Figure 5:
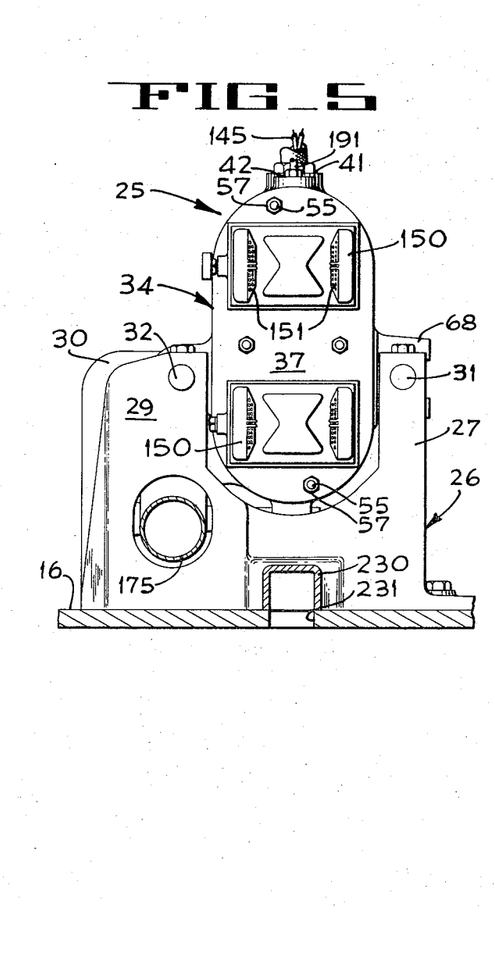
FIGURE 5 is a front vertical section taken on line 5—5 in FIGURE 1.
Figure 8:
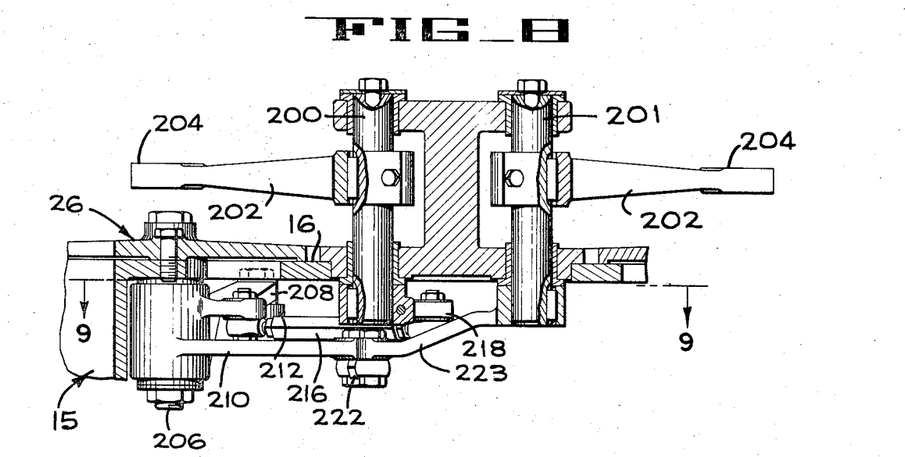
FIGURE 8 is a fragmentary vertical section taken on line 8—8 in FIGURE 1 but showing only selected portions of the driving mechanism of the present apparatus.

For imparting reciprocating movement to the housing 34, auxiliary shafts 200 and 201 are journalled in upright positions in the support frame 15 in spaced relation to each other, it being noted from FIGS. 1 and 4 that these shafts are located forward of the mounting piece 194 and project upward from the upper surface 16. Auxiliary levers 202 have inner ends individually secured to these auxiliary shafts and project radially outward therefrom (FIGS. 1, 4 and 8). The levers have forks 204 at their outer ends individually receiving the bearings 46 (FIG. 3) on the housings. A main shaft 206 (FIGS. 6, 8 and 9) is also journalled in the frame beneath the surface 16, and main levers 208 and 210 are keyed to and project radially from the main shaft under the upper surface 16. A cam follower 212 is mounted on the main lever 208 for engagement with a cam, not shown, but one which is effective to oscillate the main levers through a predetermined angle, much in the same manner as disclosed in the above cited co-pending application Ser. No. 461,738. The frame 15 has a raised portion 230 over the outer end of the main lever 208 and an access hole 231 is provided in the raised portion for gaining access to the cam follower 212 and its mounting.

An adjustable link 216 has one end pivoted to the main lever 208 between the main shaft 206 and the cam follower 212 and an opposite end pivoted to a fixed link 218, the opposite end of the fixed link being rigidly secured to the auxiliary shaft 200. Further, an adjustable link 222 has one end pivoted to the outer end of the main lever 210 and an opposite end pivoted to a fixed link 223 having its opposite end secured to the auxiliary shaft 201.

Figure 9:
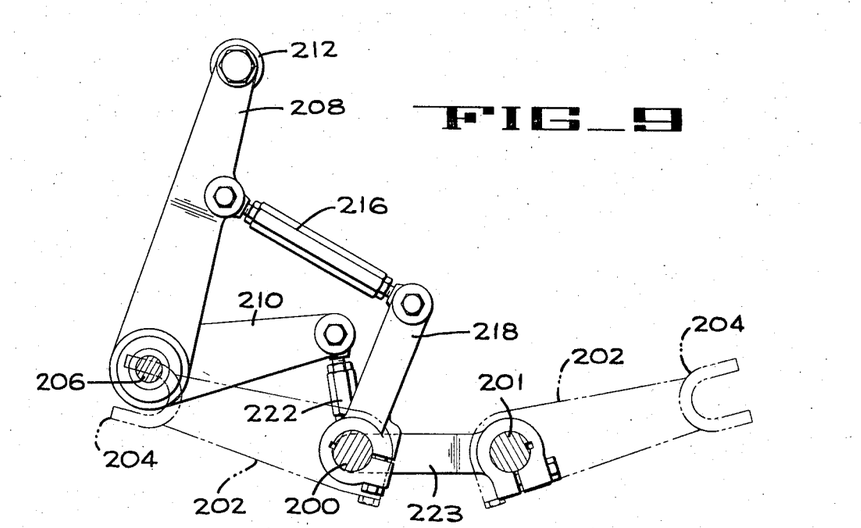
FIGURE 9 is a horizontal section taken on line 9—9 in FIGURE 8 but with the auxiliary levers of FIGURE 8 being shown in phantom.

With reference to FIG. 9, it will be understood that as the main lever 208 is moved in a counterclockwise direction, the auxiliary shaft 200 is turned in a counterclockwise direction whereas the auxiliary shaft 201 is turned in a clockwise direction. After the main lever 208 has reached the end of its stroke, it returns in a clockwise direction thereby causing the shaft 200 to turn in a clockwise direction and the shaft 201 to turn in a counterclockwise direction. The auxiliary shafts are thus oscillated in opposite directions while the main shaft and the main levers are moving in either of their two directions of movement. Furthermore, as the main lever 208 moves in a counterclockwise direction, the housings 34 are moved rearwardly and as the main lever moves in a clockwise direction, the housings are moved forwardly, all as is believed readily understood from the foregoing description.

Briefly to summarize the operation of the subject apparatus, the air blower 170 blows air at a relatively low temperature (i.e. low relative to the temperature of discharge at nozzles 150) into the manifold 160 where the air travels through the air pipes 175 into the outer or inlet chambers 88. In each housing, the air travels lengthwise forwardly from the inlet 40 through the outer chamber and emerges therefrom through the notches 82 into the intermediate chamber 96. The air travels lengthwise of the intermediate chamber toward the rear thereof and emerges from the intermediate chamber into the rear plenum chamber 112. From this rear chamber, the air enters the outer tubes 127 but not the central tube 120 because of the cap 130. The air travels forwardly through the outer tubes and exits therefrom into the inner chamber 114 and passes rearwardly again alongside of the tubes 120 and 127 entering the central tube through the ports 125. The air then travels forwardly through the central tube emerging through the central port 103 into the front plenum chamber 106 from where the air passes through the outlets 50 and 51 into the discharge nozzles 150 which direct the air through the apertures 151 onto the appropriate surfaces of the cartons, not shown, on the mandrels 18.

During the above described movement of air through the housing 34, the heater elements 142 are energized so that as the air passes through the outer and central tubes 127 and 120 it passes over these hot elements and is thus raised in temperature. In addition, before the air actually reaches the inside of the tubes, and as the air is traveling along said sinuous passage, it is being preheated as a result of heat being radiated outward from the heater elements.

However, it is significant to note that the temperature of air in the outer chamber 88 is not appreciably above the temperature of the air entering the outer chamber so that the temperature of the peripheral walls 36 and the back end walls 38 of the housing 34 remains low enough that these walls can be touched with the human hand without discomfort.

The air passing through the housing 34 is thus elevated in temperature so that the air being discharged from the nozzles 150 is at a predetermined temperature which is the temperature required to melt the coating on the cartons and render such coating tacky enough for sealing purposes.

In an actual embodiment of the invention, the heater elements 142 are operated at 900° F., the temperature of the air in the outer chamber is about 100° F. to 130° F., and the temperature of the air being discharged from the nozzle 150 is about 600° F. These temperatures are set forth by way of example only and not to limit the invention thereto.

During the above described air movement and heating, the housings 34 are being reciprocated by the operation of the main and auxiliary levers 208, 210, and 202 between forward positions with the discharge nozzles 150 in closely confronting, although spaced relation, to cartons, not shown, on the mandrels 18, and rearward positions spaced farther from the mandrels so as to allow the mandrels to be indexed from one station to the next.

From the foregoing description, it will be understood that a heating apparatus has been provided which eliminates certain problems existing in the apparatus disclosed in the co-pending application Ser. No. 461,738. The apparatus described herein is more efficient in the use of heat in that less heat is required to heat a carton and less heat is lost through radiation to the atmosphere around the apparatus thereby resulting in a cooler environment for operating personnel. By way of contrast, the nine heater elements in the former apparatus were each preferably operated at about 1800° F. whereas the six heater elements of the present apparatus are preferably operated at about 900° F. which latter requires less than one-half the wattage formerly used. Moreover, many surfaces of the apparatus remain at such low temperatures that they can be touched by hand without danger or discomfort. Furthermore, because the heater elements are located closely adjacent to the discharge nozzles, they can be operated at a temperature closer to the temperature at which it is desired to discharge the air onto the surface of the article. Accordingly, the elements are heated to temperatures which are far below the stress limits of the elements, and oxidation and resultant flaking of these elements are avoided. Still further, because the temperature surrounding the heater is considerably reduced, less expensive bearing materials can be used thereby resulting in quieter operation and longer life; formerly, bearings were operating in excess of 1000° F. Another advantage is that fewer parts are employed in the improved heater thereby resulting in a simpler and lighter construction.

Reference is made to my copending application Ser. No. 491,297 filed Sept. 25, 1965, assigned to the assignee of the present invention, which also pertains to heating apparatus.

Although a preferred embodiment of the present invention has been shown and described, it will be understood that various changes and modifications may be made in the details thereof without departing from the spirit and the scope of the appended claims.

Having described the invention, what is claimed as new and desired to bt protected by Letters Patent is as follows:

1. In a heating apparatus, wall means surrounding an interior and including a first wall having an inlet; air conducting means in said interior providing an inlet chamber with said first wall, said wall means and conducting means providing a sinuous passage extending away from said chamber; means for moving air at a relatively low temperature through said inlet into said inlet chamber, to maintain said first wall cool enough to be touched by a human hand, and thence into said passage; and means in said passage for raising the temperature of said moving air, said temperature raising means including at least two independent heating elements, said means for moving the air directs the air past one heating element in one direction whereby the air is partially heated and thereafter directs the partially heated air in the opposite direction past the other heating element thereby progressively raising the temperature of the air to said relatively high temperature.

2. In a heating apparatus, wall means having a peripheral portion circumscribing a predetermined axis and an end portion having an outlet, said peripheral portion having an inlet; air conducting means within said wall means and defining therewith a generally sinuous passage winding its way from said inlet alternately lengthwise of said peripheral portion and inwardly toward said axis and thence to said outlet; means for moving air into said inlet, through said passage, and out of said outlet; and means for raising the temperature of the air as said air moves through said passage, said temperature raising means including at least two independent heating elements, said means for moving the air directs the air past one heating element in one direction whereby the air is partially heated and thereafter directs the partially heated air in the opposite direction past the other heating element thereby progressively raising the temperature of the air to said relatively high temperature.

3. In an apparatus for directing air at a high temperature onto an article, means for moving said article into and out of a heating station; wall means having a peripheral portion surrounding a predetermined axis and an end portion having an outlet; means mounting said wall means with said outlet directed toward said heating station and for movement of said wall means toward and away from said station; air conducting means within said wall means and defining therewith a sinuous passage including an inlet chamber circumscribing said axis and winding from said chamber both lengthwise and inwardly toward said axis to said outlet; means for moving air at a relatively low temperature less than said high temperature into said chamber, through said passage and out said outlet; and means in said passage for raising the temperature of said air from said relatively low temperature to said relatively high temperature.

4. An apparatus according to claim 3 wherein said temperature raising means includes at least two independent heating elements and wherein the means for moving the air directs the air past one heating element in one direction whereby the air is partially heated and thereafter directs the partially heated air through the past heating element thereby progressively raising the temperature of the air to said relatively high temperature.

5. In a heating apparatus, a support, a pair of slide rods mounted on the support in spaced substantially parallel relation to each other, a housing located between said slide rods having an inlet adjacent to one of said rods and an outlet directed outward from between said rods, a discharge nozzle connected to said outlet, means for moving air from said inlet through said housing and out said outlet and nozzle, means in said housing for heating air passing therethrough, means mounting said housing on said rods for movement of said housing lengthwise of said rods, said rods being in a common substantially horizontal plane, a driven member connected to and located below said housing, a shaft rotatably mounted in said support, a lever secured to said shaft and coupled to said driven member, and means for oscillating said shaft thereby to reciprocate said housing on said rods.

6. In a heating apparatus, a support, a housing having an outlet and an inlet, a discharge nozzle connected to said outlet, means in said housing for raising the temperature of air moving from said inlet to said outlet, means mounting said housing on said support for reciprocating movement, means for imparting said reciprocating movement to said housing, an air duct mounted in said support in a stationary position relative to said housing, an air pipe having a discharge end connected to the inlet of said housing and an inlet end adjacent to said duct, and means coupling said duct and said inlet end of the air pipe in fluid-tight relation and for accommodating movement of the air pipe with the housing relative to said duct.

7. An apparatus according to claim 6 and additionally comprising air conducting means within said housing and defining therewith a sinuous passage for guiding the air from said inlet to said outlet, and wherein said temperature raising means includes at least two independent heating elements and wherein the means for moving the air directs the air past one heating element in one direction whereby the air is partially heated and thereafter directs the partially directed air in the opposite direction past the other heating element thereby progressively raising the temperature of the air to said relatively high temperature.

8. In a heating apparatus, a support, a pair of heaters each having a peripheral side wall and front and rear end walls connected to their respective side walls, each front end wall having an outlet and each side wall having an inlet, means mounting said housing on the support for forward and rearward reciprocating movement toward and away from heating stations located forwardly of said outlets, an air manifold mounted on said support in a stationary position with respect to said housings, air pipes having discharge ends individually connected to said inlets and receiving ends projecting into said manifold, means providing a sliding fluid-tight connection between said manifold and said pipes whereby said pipes are in fluid-tight relation with said manifolds but are able to reciprocate with said housings relative to said manifolds, and means in said housings for heating air passing from said inlets to their respective outlets.

9. In a heating apparatus, a support, a pair of heaters each including a housing having a peripheral side wall which has an inlet and a front end wall which has an outlet, means individually mounting said housings on said support for fore and aft movement toward and away from heating stations located forwardly of said outlets, driving members individually projecting from said side walls substantially normally of the fore and aft direction of movement of the housings, a pair of shafts journalled in the support in substantially parallel relation to said driving members, levers individually connected to said shafts and individually coupled to said driving members so that the housings are moved fore and aft in response to oscillation of said shafts, a main shaft mounted in said support for pivotal movement about an axis substantially parallel to said pair of shafts, and linkage means interconnecting said main shaft and said pair of shafts for oscillating said pair of shafts in response to oscillation of said main shaft, said linkage means causing said pair of shafts to turn in opposite directions relative to each other during movement of said main shaft in either of its directions of movement.

10. A heater comprising a housing having a substantially elliptical peripheral wall provided with an inlet front end wall means provided with an outlet and connected to said peripheral wall, back end wall means connected to said peripheral wall in spaced substantially parallel relation to said front end wall means, a substantially elliptical intermediate wall mounted within said housing in circumferentially spaced relation to said peripheral wall having front and rear edges respectively sealingly engaging said front and rear end wall means, said intermediate wall having opening means adjacent to said front edge but otherwise being imperforate, said peripheral and intermediate walls defining an annular inlet chamber communicating with said inlet, a substantially elliptical imperforate inner wall positioned within said intermediate wall and defining therewith an annular intermediate chamber communicating with said opening means, said inner wall having a rear edge spaced from said back end wall means and a front edge sealingly engaging said front end wall means, an outlet wall engaging said front end wall means and defining therewith a front plenum chamber communicating with said outlet and having a port leading into said plenum chamber, a chamber wall mounted in said housing in spaced relation to said back end wall means and defining therewith a rear plenum chamber communicating with said intermediate chamber, said end plate, outlet wall and inner wall defining an inner chamber, an open-ended central tube mounted in said chamber wall and having a front end in registry with the port in the outlet wall, a rear open end and a rear port communicating with said inner chamber, means closing the rear end of the central tube to block communication between said central tube and said rear plenum chamber, an outer tube having a rear end mounted in said chamber wall and communicating with said rear plenum chamber and a front end opening into said inner chamber, means in said tubes for heating air passing therethrough, and a discharge nozzle connected to the outlet in said front end wall means.

11. The apparatus of claim 10 wherein said front end wall means has a pair of outlets, and wherein there are a pair of discharge nozzles individually connected to said outlets.

12. The apparatus of claim 10 wherein there is another outer tube positioned on the opposite side of said central tube from said first mentioned outer tube.

13. The apparatus of claim 10 wherein said front and back end wall means are insulated from said side wall.

14. A heater comprising a housing having a peripheral wall provided with an inlet, front end wall means provided with an outlet and connected to said peripheral wall, back end wall means connected to said peripheral wall spaced in substantially parallel relation to said front end wall means, an intermediate wall mounted within said housing in circumferentially spaced relation to said peripheral wall having front and rear edges progressively sealingly engaging said front and rear end wall means, said intermediate wall having opening means adjacent to said front edge but otherwise being imperforate, said peripheral and intermediate walls defining an annular inlet chamber communicating with said inlet, an imperforate inner wall positioned within said intermediate wall and defining therewith an annular intermediate chamber communicating with said opening means, said inner wall having a rear edge spaced from said back end wall means and a front edge sealingly engaging said front end wall means, a chamber wall mounted in said housing in spaced relation to said back end wall means, an open-ended central tube mounted in said chamber wall, a pair of outer tubes in planar alignment with said central tube and having a rear end mounted in said chamber wall, means in said tubes for heating air passing therethrough, and discharge nozzle connected to the outlet in said front end wall means.

References Cited
UNITED STATES PATENTS

| | | | |
|---|---|---|---|
| 1,869,737 | 8/1932 | Breuer | 219—374 X |
| 1,985,136 | 12/1934 | Amoo | 219—374 |
| 2,396,968 | 3/1946 | Phillips | 263—19 |
| 2,490,252 | 12/1949 | Brewer | 263—4 X |
| 2,863,980 | 12/1958 | Logan | 219—371 X |
| 3,188,064 | 6/1965 | Plescia | 263—4 |
| 3,236,160 | 2/1966 | Mullaney | 263—7 X |
| 3,270,182 | 8/1966 | Hynes | 219—374 X |

FOREIGN PATENTS
985,091 3/1965 Great Britain.

JAMES W. WESTHAVER, Primary Examiner.
JOHN J. CAMBY, Examiner.